(12) United States Patent
Dickson et al.

(10) Patent No.: US 7,522,044 B2
(45) Date of Patent: Apr. 21, 2009

(54) MONITORING PROCESS AND SYSTEM

(75) Inventors: Adam Matthew Dickson, Heidelberg (AU); Casper Murtonen, Greensborough (AU); Jonathan Spring, Kew (AU); Austin Phillips, Blackburn South (AU); Terrance Robb, Melbourne (AU)

(73) Assignee: CEOS Industrial Pty Ltd, Victoria (AU)

( * ) Notice: Subject to any disclaimer, the term of this patent is extended or adjusted under 35 U.S.C. 154(b) by 363 days.

(21) Appl. No.: 10/479,464

(22) PCT Filed: Jun. 4, 2002

(86) PCT No.: PCT/AU02/00721
§ 371 (c)(1),
(2), (4) Date: Mar. 29, 2004

(87) PCT Pub. No.: WO02/099440
PCT Pub. Date: Dec. 12, 2002

(65) Prior Publication Data
US 2004/0149939 A1    Aug. 5, 2004

(30) Foreign Application Priority Data

| Jun. 4, 2001 | (AU) | ................................... | PR 5447 |
| Jun. 4, 2001 | (AU) | ................................... | PR 5448 |
| Jun. 4, 2001 | (AU) | ................................... | PR 5449 |
| Jun. 4, 2001 | (AU) | ................................... | PR 5704 |
| Jul. 24, 2001 | (AU) | ................................... | PR 6558 |

(51) Int. Cl.
*G08B 13/18* (2006.01)

(52) U.S. Cl. ........................ 340/555; 340/541; 340/556; 340/565

(58) Field of Classification Search ................. 340/555, 340/541, 552, 556, 557, 565, 567
See application file for complete search history.

(56) References Cited

U.S. PATENT DOCUMENTS 4,760,381 A * 7/1988 Haag .......................... 340/556

(Continued)

FOREIGN PATENT DOCUMENTS

EP    0877253 A1    11/1998

(Continued)

OTHER PUBLICATIONS

ITS Interprovincial Traffic Services Ltd., its- Data Collection Equipment—ADR-2000.

(Continued)

*Primary Examiner*—Daryl C Pope
(74) *Attorney, Agent, or Firm*—Nixon & Vanderhye P.C.

(57) ABSTRACT

A monitoring system includes a transmitter (102) with two transmit modules (208, 210) and a receiver (104) with two receive modules (212, 214). Each of the transmit modules (208, 210) generates an optical signal modulated at a unique frequency. The optical signals are transmitted across a roadway (112) and are detected by the receive modules (212, 214). When a vehicle (110) moves between the transmitter (102) and receiver (104), the optical signals are blocked. The receiver (104) generates timestamped make and break events corresponding to the blocking and unblocking of the signals, and these are used to determine parameters for the vehicle (110) such as velocity and vehicle classification. Because each signal is modulated at a different frequency, each receive module (212, 214) can distinguish the signals received from each of the transmit modules (208, 210), allowing the lane position of the vehicle (110) in a multi-lane roadway (112) to be determined.

36 Claims, 6 Drawing Sheets

U.S. PATENT DOCUMENTS

| | | | |
|---|---|---|---|
| 5,101,200 A * | 3/1992 | Swett | 340/937 |
| 5,298,738 A * | 3/1994 | Gebert et al. | 250/222.1 |
| 5,357,254 A * | 10/1994 | Kah, Jr. | 342/42 |
| 5,392,034 A * | 2/1995 | Kuwagaki | 340/933 |
| 5,537,110 A * | 7/1996 | Iida et al. | 340/942 |
| 5,550,551 A * | 8/1996 | Alesio | 342/457 |
| 5,577,733 A * | 11/1996 | Downing | 273/348 |
| 5,812,081 A * | 9/1998 | Fullerton | 342/21 |
| 5,821,879 A | 10/1998 | Liepmann | |
| 5,988,645 A * | 11/1999 | Downing | 273/348 |
| 6,054,920 A * | 4/2000 | Smith et al. | 340/506 |
| 6,212,468 B1 * | 4/2001 | Nakayama et al. | 701/117 |
| 6,373,389 B1 * | 4/2002 | Przygoda et al. | 340/572.4 |
| 6,853,302 B2 * | 2/2005 | Monroe | 340/573.1 |
| 6,965,438 B2 * | 11/2005 | Lee et al. | 356/625 |

FOREIGN PATENT DOCUMENTS

| | | |
|---|---|---|
| FR | 2566913 | 1/1986 |
| JP | 10326399 | 12/1998 |
| JP | 2000-285380 | 10/2000 |
| JP | 2000-353291 | 12/2000 |
| JP | 2001-34886 | 2/2001 |
| WO | WO83/02165 | 6/1983 |

OTHER PUBLICATIONS

International Search Report and International Preliminary Examination Report.

* cited by examiner

MONITORING PROCESS AND SYSTEM

This application is the U.S. national phase of international Application PCT/AU2/00721 filed 4 Jun. 2002 which designated the U.S.

FIELD OF THE INVENTION

The present invention relates to a monitoring process and system, and in particular to a system and process for monitoring objects such as vehicles.

BACKGROUND

There are many situations where it is important to monitor moving objects. The monitoring can include monitoring the simple fact that an object has passed by, the direction of movement, counting the number of objects passing by, determining the speed of these objects, and/or classifying the objects, perhaps into one or more of a number of categories or types. Traffic monitoring is an example of such an application, where the passage of vehicles on a road is monitored, perhaps in order to count the number of vehicles using the road over some period of time, and/or to monitor the velocities of these vehicles. Traditionally, traffic monitoring systems have relied on a pair of compressible pneumatic tubes laid across a roadway. When a wheel of a passing vehicle runs over one of the tubes, a sensor at the end of the tube detects the resulting increase in air pressure, and thus detects the presence of a vehicle. The time delay between detection events in each tube provides an indication of the vehicle speed. However, these simple systems do not discriminate the position of the compressed section, and are thus not useful for multi-lane highways. Furthermore, they generally provide no further information on the vehicle. It is desired to provide a system and process that alleviate one or more difficulties of the prior art, or at least provide a useful alternative to existing systems and processes.

SUMMARY OF THE INVENTION

In accordance with the present invention there is provided a process for monitoring a moving object, including the steps of:
   generating an optical signal modulated at a modulation frequency;
   transmitting said optical signal across a path of said moving object;
   detecting changes in a received signal due to movement of said object by monitoring substantially at said modulation frequency; and
   determining at least one parameter of said object on the basis of said changes.

The present invention also provides a process for determining a position of a moving object, including associating a time value with at least one make or break event for each of at least three signals due to the passage of said object between a transmitter and a receiver of each of said signals, at least one of said signals being substantially inclined with respect to another of said signals, and determining the position of said object in a direction substantially transverse to said moving direction by comparing said time values.

The present invention also provides a process for determining at least one parameter of a moving object from timestamped make and break events representing the making and breaking of first and second signals due to the passage of at least two moving objects past two detection locations for said signals, said locations mutually spaced in a moving direction of said objects, and said at least two moving objects being mutually spaced substantially transverse to said moving direction, said process including:
   selecting at least two events for said first signal;
   for each selected event:
       forming pairs of said selected event with events of the same type for said second signal;
       for each pair, determining a velocity value from the timestamp values of said pair;
       forming at least one pair of correlated event pairs by correlating event pairs for a selected event with event pairs for another selected event having a substantially equal velocity;
       for each pair of correlated event pairs, determining a length value from timestamp values of said pair of correlated event pairs; associating with said object a pair of correlated event pairs whose length value is less than a pre-determined value; and
   determining at least one parameter of said object from timestamp values of said associated event pairs.

The present invention also provides a process for discriminating between objects moving in a moving direction and spaced substantially transverse to said moving direction, including:
   sending signals across a path of said moving objects;
   detecting changes in state of said signals and recording events for said changes with respective times; and
   processing said events of said signals to group events corresponding to a respective moving object on the basis of said times for said events.

The present invention also provides a process for monitoring a moving object, including receiving an optical signal modulated at a modulation frequency, converting said optical signal to an electrical signal, digitising said electrical signal, and downconverting said digitised signal to provide data representative of at least one parameter of said object.

The present invention also provides a system for monitoring a moving object, including a receiver for receiving an optical signal modulated at a modulation frequency, said receiver including an input module for converting said optical signal to an electrical signal, an analog-to-digital (ADC) converter for digitising said electrical signal, and a digital signal processor (DSP) for demodulating said digitised signal and providing output data representative of at least one parameter of said object.

The present invention also provides a receive module for receiving a signal modulated at a modulation frequency, said receive module including a sensor coupled to an input circuit having at least one variable resonant circuit, and feedback circuitry for matching the resonant frequency of said resonant circuit to said modulation frequency to maximise the input impedance of the input circuit at said modulation frequency.

The present invention also provides a receiver including at least two receive modules, said receive modules being mutually spaced in a moving direction of an object, and each receive module being adapted to receive an optical signal modulated at a unique frequency.

The present invention also provides a system for monitoring a moving object, including at least two transmitter modules for transmitting respective optical signals, each of said optical signals being modulated at a unique frequency.

The present invention also provides a monitoring system for vehicles, including:
   transmit modules for transmitting separated optical signals at respective modulation frequencies across a carriageway for said vehicles;

receive modules for detecting optical signals substantially at said modulation frequencies, respectively;

means for generating make and break event data corresponding to unblocking and blocking of said signals by at least one of said vehicles; and means for determining at least one parameter for the vehicle on the basis of said event data, which includes time values corresponding to said unblocking and blocking.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
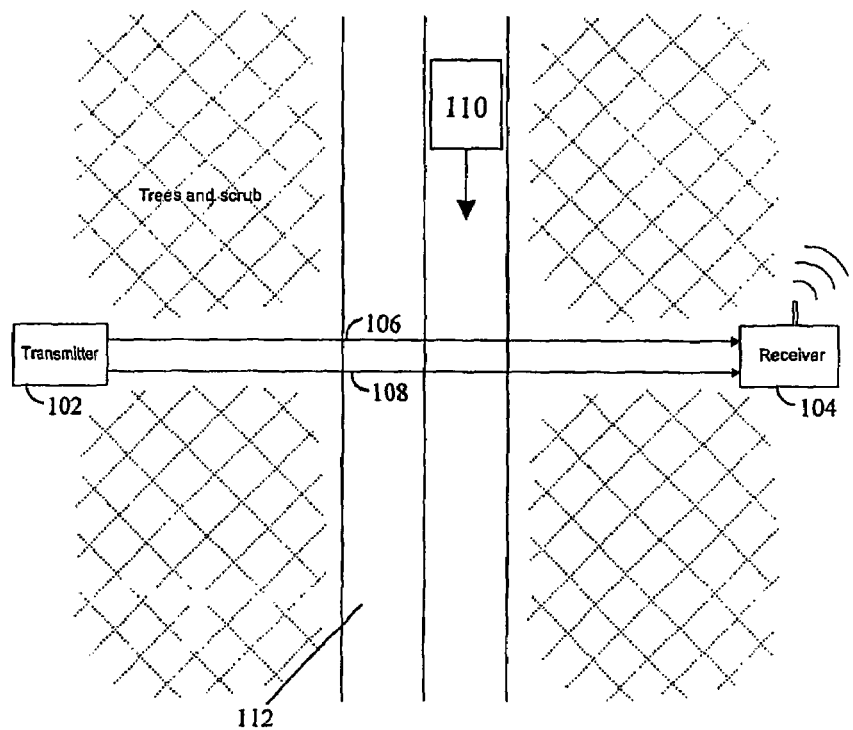
FIG. 1 is a schematic diagram showing a preferred configuration of a monitoring system.

A monitoring system, as shown in FIG. 1, includes a transmitter 102 and a receiver 104. The transmitter 102 transmits optical signals 106 and 108 which are received by the receiver 104. The monitoring system executes a monitoring process whereby changes in received portions of the signals 106, 108 due to the passage of an object 110 between the transmitter 102 and the receiver 104 allow the object 110 to be monitored. The monitoring process analyses these changes to determine parameters of the object 110, which may include the simple fact that the object 110 has passed, a speed or velocity of the object 110, and other characteristics of the object 110.

Figure 2:
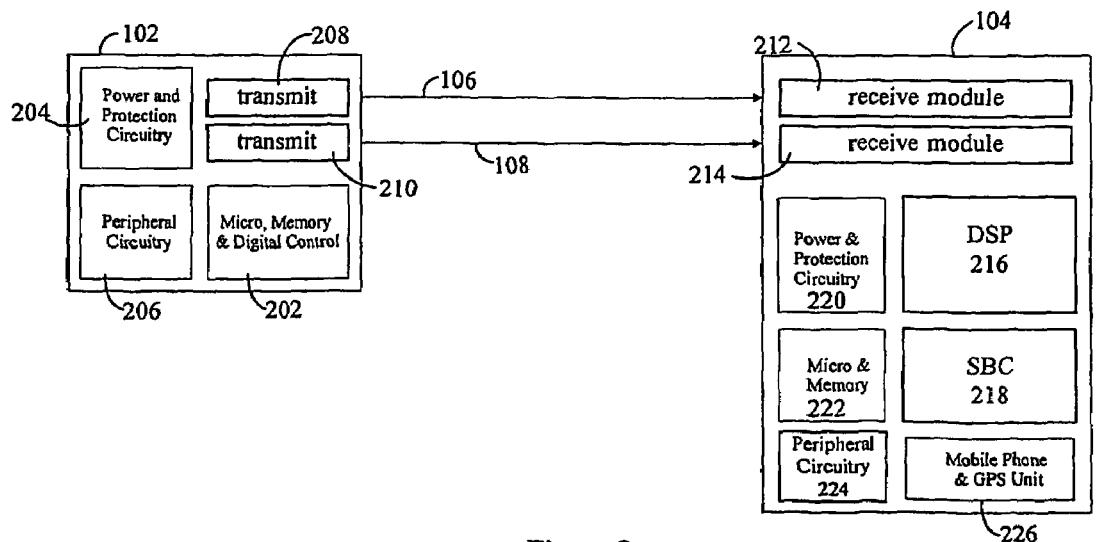
FIG. 2 is a simplified block diagram of a preferred embodiment of the monitoring system.

The monitoring system can be used as a traffic monitor, in which case the object 110 is a vehicle such as a motorbike, car or truck. In this embodiment, the transmitter 102 and receiver 104 are placed on opposite sides of a roadway 112, as shown in FIG. 1. Ideally, the transmitter 102 and receiver 104 are hidden from view, amongst trees and scrub, for example, so that vehicle drivers will not see the transmitter 102 or receiver 104, allowing the monitoring system to obtain an accurate measure of vehicle velocity. As shown in FIG. 2, the transmitter 102 includes a microprocessor and digital control module 202, power and protection circuitry 204, peripheral circuitry 206 providing support functions such as battery voltage detection, and a pair of transmit modules 208, 210, each including an infra-red (IR) light-emitting diode (LED). In use, the transmitter 102 is positioned so that the two transmit modules 208, 210 are positioned in a plane parallel to the roadway 112. Each transmit module 208, 210 transmits an ≈880 nm infra-red optical beam 106, 108 across the roadway 112 and close to the road surface, typically at a height that is less than the height of typical vehicle axles. Each transmit module 208, 210 includes a lens to focus the IR beam to produce a slowly diverging beam with a conical angle of approximately 2 degrees, with the axes of the two beam cones being parallel. The finite beam divergence facilitates the alignment of the transmitter 102 and the receiver 104.

The IR beams 106, 108 are detected by the receiver 104, which includes a pair of receive modules 212, 214, also in a plane parallel to the roadway 112, with first 212 and second 214. receive modules for the two transmitted beams 106, 108. The receiver 104 also includes a digital signal processor 216, a single board computer 218, power and protection circuitry 220, a microprocessor module 222 with keypad and liquid crystal display, peripheral circuitry 224, and a mobile phone and GPS unit module 226.

Figure 7:
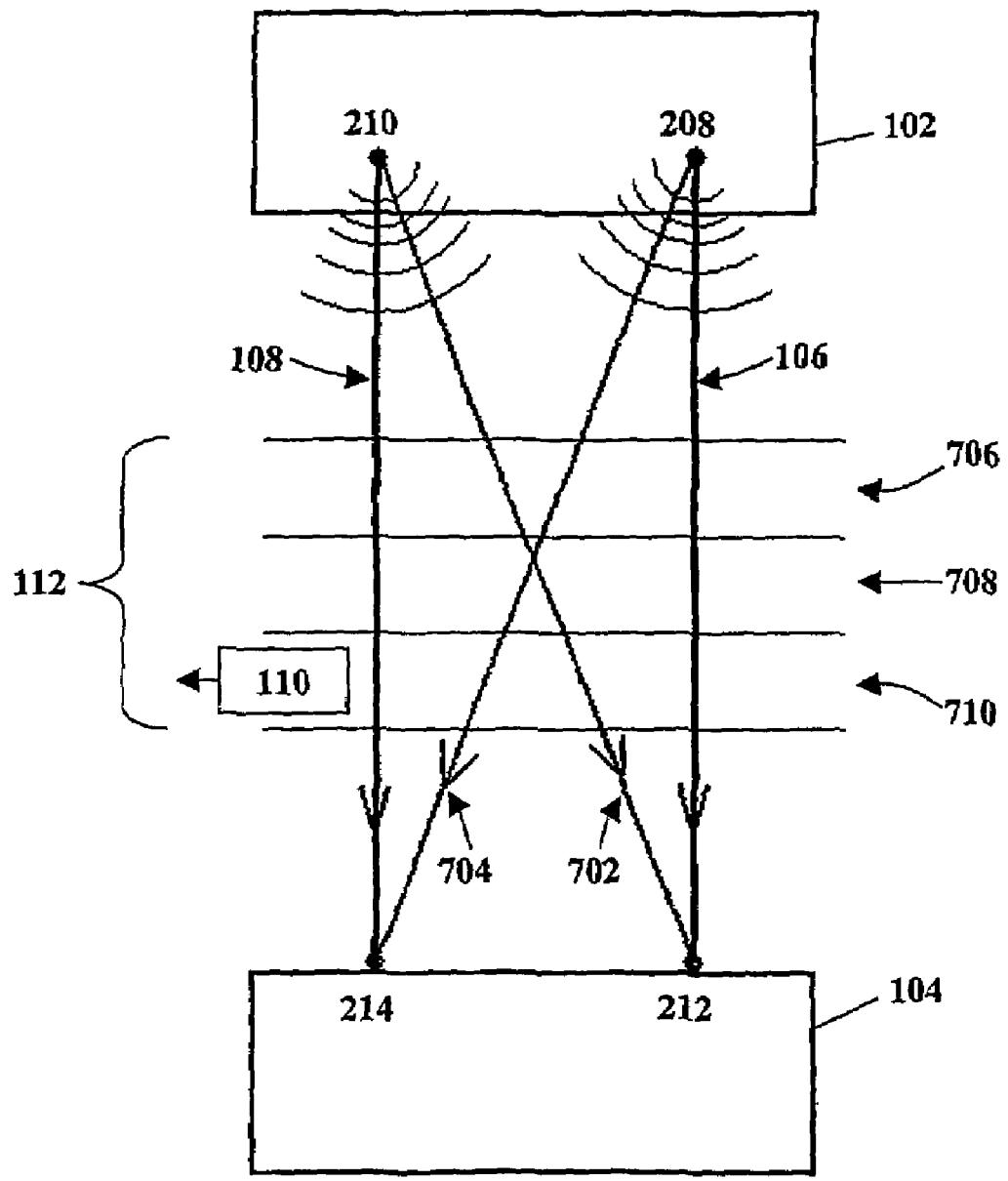
FIG. 7 is a schematic diagram of the monitoring system in use with a multi-lane roadway.

The finite divergence of the transmitted IR beams 106, 108 allows the system to be configured so that each receive module 212, 214 receives IR beams from both of the transmit modules 208, 210. As shown in FIG. 7, the total signal received by each receive module 212, 214 can therefore be considered to comprise two beams: a direct beam from the corresponding transmit module, and an indirect or cross beam from the other transmit module. For example, the first receive module 212 receives a first direct beam 106 from the first transmit module 208, and a first cross beam 702 from the second transmit module 210. In order to distinguish between the direct IR beam and the cross beam, the beam from each transmit module 208, 210 is modulated at a unique frequency, in this case at 90 kHz and 110 kHz, respectively. Accordingly, the detection circuitry of each receive module 212, 214 is tuned to provide optimal noise performance at the modulation frequency of the corresponding direct IR beam, and the signals from each receive module 212, 214 are processed in order to separate the signal component corresponding to that receive module's direct beam from the signal component corresponding to its cross beam. This also allows the receiver 104 to reject ambient light.

A direct beam 106, 108 or cross beam 702, 704 is blocked when a front tyre of the vehicle 110 obscures one of the four lines of sight between a receive module of the receiver 104 and a transmit module of the transmitter 102, and remains blocked until the rear edge of the tyre moves beyond this line of sight. This blocking and unblocking, or 'break and make', of the beam occurs again as the rear tyre of the vehicle 110 passes between the transmitter 102 and receiver 104. Thus each time a vehicle 110 passes between the transmitter 102 and the receiver 104, each axle of the vehicle produces four break-and-make pairs: two at each receive module 212, 214, corresponding to the direct beam and the cross beam for that module.

Figure 3:
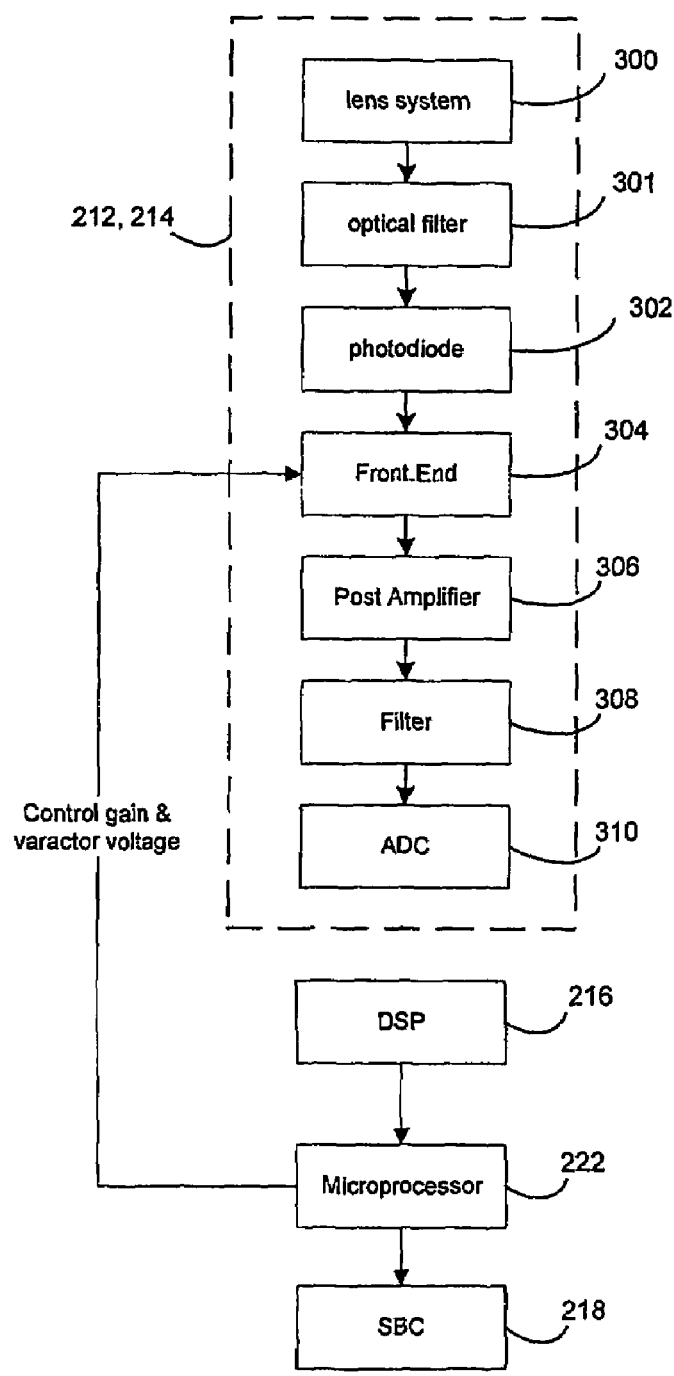
FIG. 3 is a simplified block diagram of a receiver of the monitoring system.

As shown in FIG. 3, each receive module 212, 214 includes a multi-layer dielectric optical filter 301 with a passband centered on 880 nm and a −3 dB width of 100 nm: narrow enough to exclude as much ambient light as possible whilst being wide enough to admit almost all of the incident energy from the IR diodes of the transmit modules 208, 210. Each receive module 212, 214 also includes a lens system 300, a photodiode 302, a front-end module 304, a post amplifier module 306, a filter module 308, and an analog to digital converter (ADC) 310. The digital output signal from the ADC 310 of each receive module 212, 214 is sent to a digital signal processor (DSP) 216. The DSP 216 identifies the making and breaking of each beam and generates MAKE and BREAK event data, respectively. Each event is timestamped and labelled to identify which of the two receive modules 212, 214 the event originated from, and whether a direct beam 106, 108 or a cross beam 702, 704 was involved.

The events generated by the DSP 216 are passed to the microprocessor 222 of the receiver 104. The event data is then passed to a single-board computer (SBC) 218, which uses the events to determine the vehicle speed and type, the vehicle lane (for multi-lane roadways), and to generate vehicle statistics. In addition to processing signal data, the microprocessor 222 provides feedback to the front-end module 304 of each receive module 212, 214, as described below.

The SBC 218 takes an input stream consisting of labelled and timestamped (in microseconds) MAKE and BREAK events due to the passage of a vehicle axle between a transmit module 208, 210 and a receive module 212, 214, and generates an output data stream providing vehicle axle spacings, vehicle velocity, vehicle lane, and arrival time of the first axle. To generate this output data, the SBC 218 first identifies vehicles from the input event stream by using MAKE and BREAK events to determine the velocity of the passing axles. This is complicated in the case of multi-lane roads 112, because vehicles in one lane can obscure vehicles in other lanes, with the result that some MAKE and BREAK events may be missing.

If the identification of vehicle lane is not important, the system can be used in a mode wherein the cross beams 702, 704 are not identified by the DSP 216. In this mode, the following process is used to associate events with vehicles. First, each BREAK event (similarly each MAKE event) from one direct beam is matched with all the conceivable corresponding BREAK events from the other direct beam. Only one of the matches can be correct, and this is determined as follows. For each possible event match, the difference between the timestamp values of the two events is used to determine a velocity. The timestamp value difference represents a velocity, as the distance between the beams 106 and 108 is known and fixed by the physical configurations of the transmitter 102 and receiver 104. If the match is correct, then that velocity should also occur elsewhere for other matches. For example, it could happen again as a MAKE event match, or as a BREAK event match for a second axle, or a MAKE event match for a second axle. In most cases, this duplication resolves any ambiguity about which match is correct.

Once the velocity of each axle is determined (twice: once using BREAK events, and again independently using MAKE events), then similar velocity axles that are spatially close enough (ie, an axle length value determined from the velocity and the timestamps for events associated with each potential axle is less than a threshold length value) can be collected together and formed into vehicles. Vehicles are specified according to their axle separations and a common velocity, with an allowance made for long vehicles that may have accelerated during the detection process. After the axle specification, an identified vehicle is further classified according to vehicle classification schemes, such as the USA FHWA Scheme F, or the Australian AUSTROAD scheme.

It is often desirable to estimate the distance of the vehicle between the transmitter 102 and the receiver 104. For example, when the system is used with a multi-lane roadway, this information can be used to identify the traffic lane a vehicle is travelling along. To achieve this, the DSP 216 also identifies events associated with the cross beams 702, 704. The procedure described above is still used, but now each physical beam break (or make) occurrence ideally has four corresponding MAKE (or BREAK) events due to the inclusion of the cross beams 702, 704. Events are paired as described above, and correlated based on common velocities. Each vehicle axle is associated with up to four BREAK+ MAKE pairs. It is, of course, possible that there may be fewer if, for example, another vehicle obscures the beam at a time when a MAKE event would otherwise be generated. Having grouped event pairs into axles and vehicles, the lane position of a vehicle is determined independently for each receive module 212, 214, from the difference in timestamps of MAKE and BREAK events.

For example, with reference to FIG. 7, consider the following four events associated with a single axle of the vehicle 110 travelling along a lane 710 of a multi-lane roadway 112 with three traffic lanes 706, 708, 710:

First receive module 212 (direct beam 106) BREAK event, time $\tau \mu s$;
First receive module 212 (cross beam 702) BREAK event, time $(\tau+1000)$ µs;
Second receive module 214 (cross beam 704) BREAK event, time $(\tau+3000)$ µs; and
Second receive module 214 (direct beam 108) BREAK event, time $(\tau+4000)$ µs.

The cross beam 702 of the first receive module 212 is broken at one quarter of the time interval between when the direct beam 106 of the first receive module 212 is broken and when the direct beam 108 of the second receive module 214 is broken. The cross beam 704 of the second receive module 214 is broken at three quarters of the time between when the direct beam 106 of the first receive module 212 is broken and when the direct beam 108 of the second receive module 214 is broken. By determining a ratio of a cross beam time difference and the parallel beam time difference, the location of the vehicle 110 relative to the transmitter 102 and the receiver 104 can be determined. For example, the ratio of the first cross beam time difference and the parallel beam time difference, $(\tau+1000)-\tau/(\tau+4000)-\tau=\frac{1}{4}$, indicates that the vehicle 110 is at a distance from the receiver 104 that is one quarter of the distance from the receiver 104 to the transmitter 102. The lane position, such as the first lane 710 shown in FIG. 7, can be identified from this information if the locations of the transmitter 102 and receiver 104 relative to the roadway 112 are known.

The modulation of the transmitted IR beams 106, 108, 702, 704 is square-wave modulation, and the fundamental frequency component is used for signal processing. This signal processing is performed by the DSP 216. In the absence of vehicular traffic, the modulation spectrum of the signal from each receive module 212, 214 is ideally a delta functional form centred on the modulation frequency of the corresponding direct beam or channel. However, in the presence of traffic between the transmitter 102 and the receiver 104, the modulation spectrum is broadened due to the blocking of the direct beams 106, 108. For traffic moving at speeds of up to 150 km/hr and beam diameters of 25 mm, this spectral broadening is significant at frequencies up to 6 kHz on either side of the respective carrier frequencies. The effective pass-band of the combined detection electronics 302 to 310 of each receive module 212, 214 is therefore set to have a bandwidth of 12 kHz, one centred at 90 kHz, and the other at 110 kHz, in accordance with the modulation frequency of the optical signal transmitted by the corresponding transmit module 208, 210. This bandwidth is set within the DSP 216 and can therefore be changed to suit the desired maximum vehicle speed. For example, if the maximum speed is increased to 200 km per hour, the bandwidth can be increased to 15 kHz. However, even with the bandwidth set to 12 kHz, it is still possible to measure vehicles with speeds in excess of 200 km/hr, although there is a small penalty in the accuracy of the measurement.

The use of modulated carriers is significant for the receiver electronics, since all traffic "information" is transferred from base-band to the vicinity of the modulation or carrier frequency, and this frequency only occupies a small fractional bandwidth. Much better noise performance can be achieved from the receiver electronics when the useful signal satisfies such criteria. The actual centre frequencies of 90 kHz and 110 kHz are chosen according to additional criteria: 1) the two frequencies are sufficiently close together to eliminate the possibility that the harmonics of one modulated signal could be interpreted by the receiver 104 as a legitimate component of the other modulated signal; 2) the carrier frequencies are sufficiently high that 1/f noise phenomena within the detector electronics has negligible effect on the performance of the front end module 304; 3) the frequencies are not so high that field-effect transistor (FET) input stage channel-gate noise coupling in the detector electronics, which increases with frequency, degrades performance; 4) the frequencies are sufficiently high that individual cycles of the carrier are short in duration compared to the make-and-break traffic phenomena being measured, thereby minimising the order of filtering required within the receiver detection system and improving timestamp resolution; and 5) the frequencies are sufficiently high that the fractional bandwidth requirement is minimised, thereby making possible improved noise performance.

The current generated by the photodiode 302 of each receive module 212, 214 is converted to a voltage signal by the front-end module 304, using a transimpedance amplifier circuit topology. Each receive module 212, 214 is designed to operate with optical power levels which vary by a factor of 10,000:1, corresponding to a transmitter-receiver distance variation of 100:1 in accordance with the inverse-square law behaviour of a spreading light beam. The microprocessor 222 selects the amount of transimpedance gain in each front-end module 304 in response to optical power level information passed to it by the DSP 216. Moreover, each front-end 304 achieves low-noise performance using a form of "noise-tuning," whereby the noise gain of each front-end 304 is reduced by the use of resonant inductor-capacitor (LC) pairs whose resonant frequencies are matched to the frequencies of the respective direct optical signal. This tuning is performed by setting the capacitances of varactor diodes ? in each front-end module 304 under control of the microprocessor 222.

Figure 4:
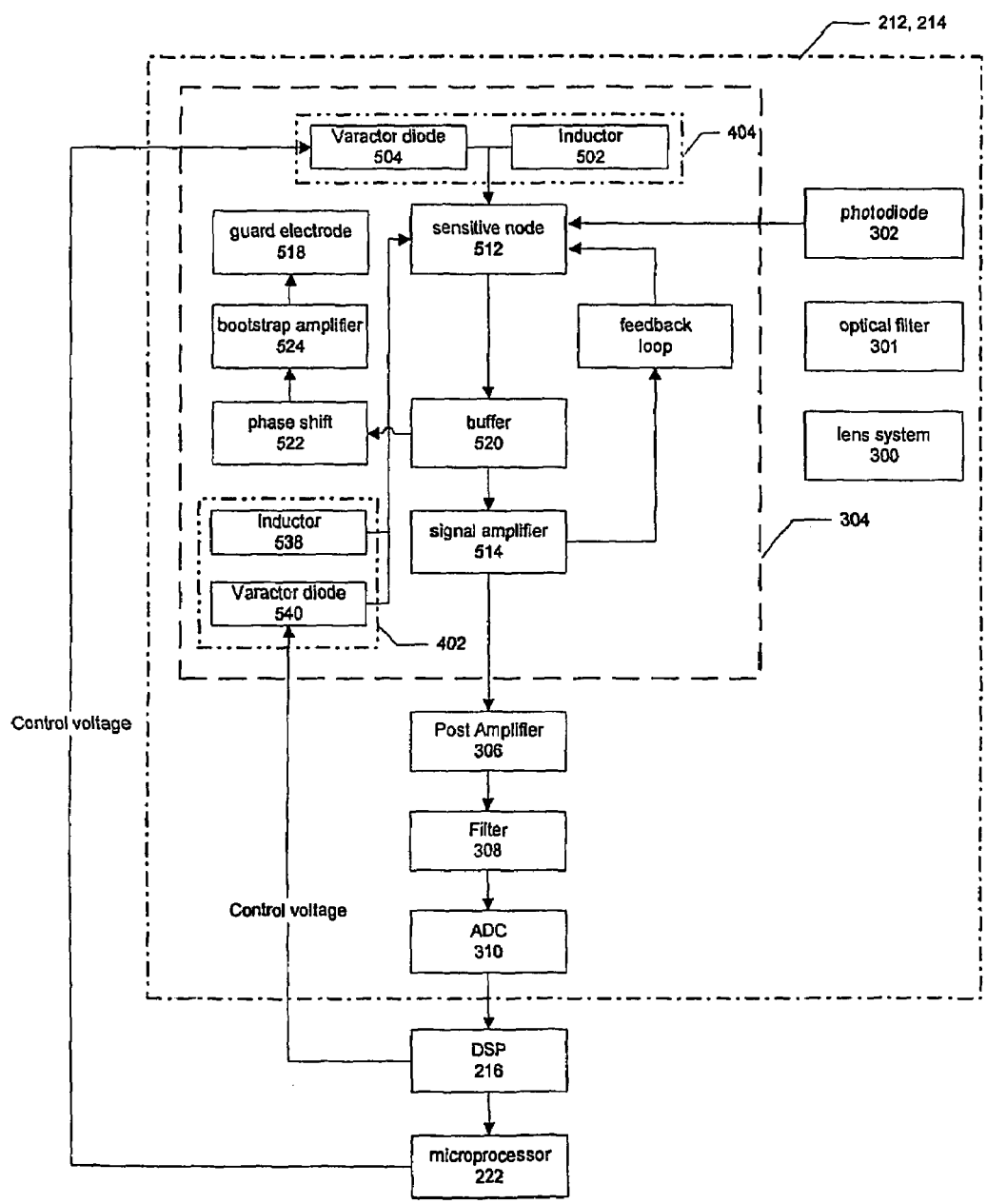
FIG. 4 is a more detailed block diagram of the receiver.
Figure 5:
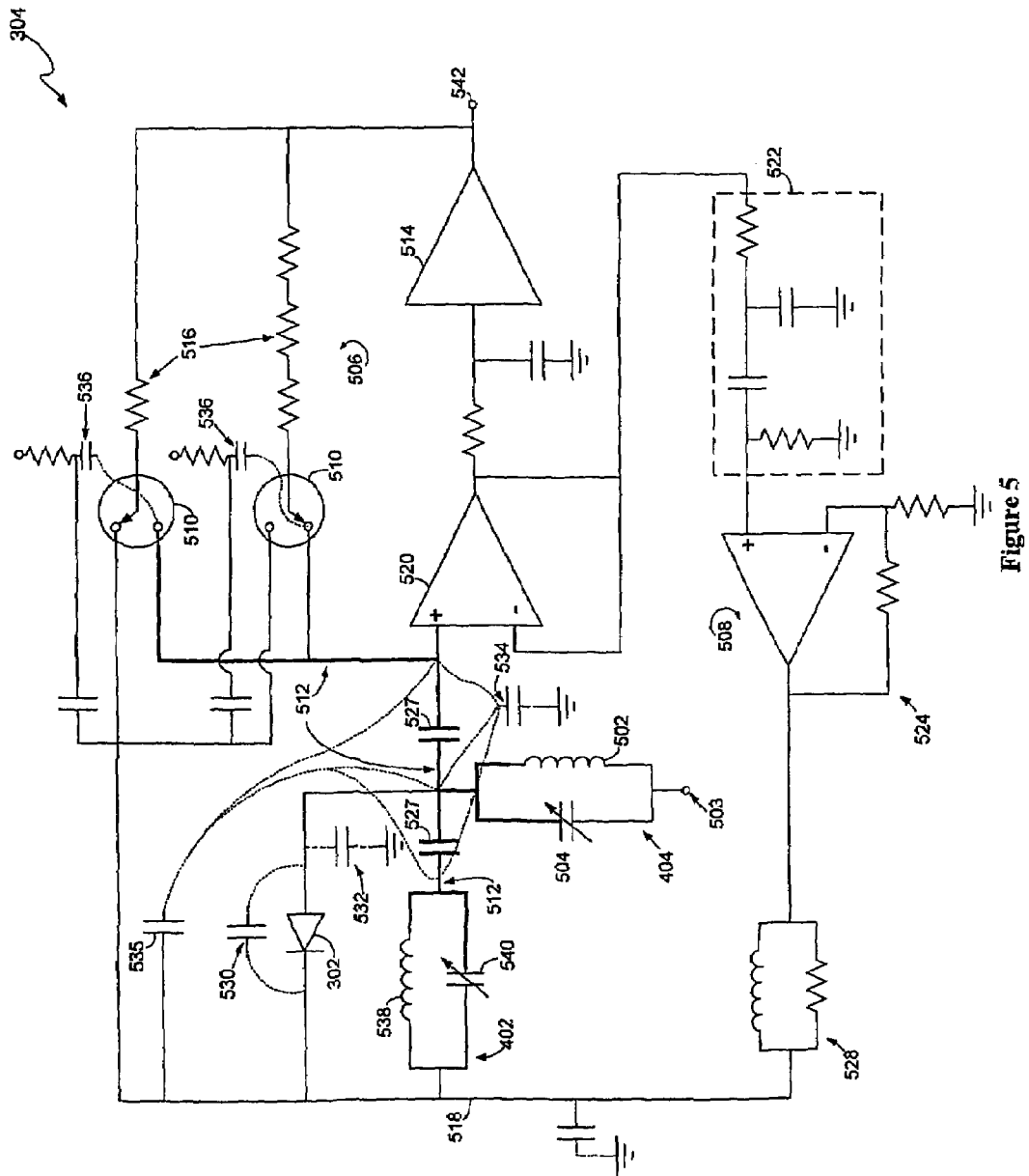
FIG. 5 is an equivalent circuit diagram of a front end module of a receiving module of the receiver.

A block diagram of a front-end module 304, as shown in FIG. 4, can be better understood with reference to a simplified equivalent circuit diagram of a front-end module 304, as shown in FIG. 5. Each front-end module 304 contains two resonant L-C pairs 402 and 404. The first L-C pair 404 includes an inductor 502 used to provide a negative bias voltage to the photodiode 302 at a terminal 503. This inductor 502 has a reactive impedance of some hundreds of k-Ohms at the carrier frequency, but when resonated with a varactor 504, it produces an overall impedance of several M-ohms for the pair 404, limited only by the resistance of the inductor 502. This increase of impedance reduces the noise gain of the front-end module 304, therefore reducing the input-referred noise current, increases the gain of a transimpedance amplifier loop 506 (therefore, on the more sensitive ranges, broadening its closed-loop response), and increases the stability margin of each front-end module 304.

The second L-C pair 402 is part of a "bootstrap" loop 508 of each front-end module 304, and is used to reduce the effect of a number of different capacitances on the open loop gain and the noise gain characteristics of each front-end 304. These capacitances include the capacitances associated with each photodiode 302 and connecting cables, the capacitances associated with analog switches 510 that are used to change the front-end sensitivity, and stray capacitances associated with the printed circuit board (PCB) layout. These capacitances are large, poorly specified, and subject to thermal and mechanical disturbances. The portion 512 of the front-end circuit carrying the small input current from the photodiode 302 is extremely sensitive to stray charge and noise, and is therefore referred to as a "sensitive node" 512, represented by thick lines in FIG. 5. Without the bootstrap loop 508, a much smaller resonant impedance would be present at the sensitive node 512, causing a dramatic reduction of the fractional bandwidth of the closed loop transimpedance gain on its more sensitive ranges.

The transimpedance amplifier loop 506 includes a signal amplifier 514 which comprises three cascaded ×10 gain current-mode amplifiers with a bandwidth of approximately 15 MHz. By selectively bypassing individual amplifiers, the signal amplifier 514 provides a selectable gain of ×10, ×100, or ×1000. The overall gain of the transimpedance loop 506 is determined by the gain of the signal amplifier 514 and the total value of the feedback resistance 516 in the loop 506, which is selected by analog switches 510 and the resonant impedance present at the sensitive node 512. Although the simplified equivalent circuit of FIG. 5 shows switches 510 and resistors 516 for only the two most sensitive ranges, additional switches and resistors (not shown) can also be switched into the main loop 506 to provide additional sensitivity ranges with increased feedback and therefore decreasing sensitivity. The signal amplifier 514 has a low input impedance. It is therefore driven by a JFET-input unity gain buffer 520 which has a high input impedance and a bandwidth of approximately 10 MHz.

The bootstrap loop 508 effectively increases the impedance present at the sensitive node 512 by buffering the voltage on the sensitive node 512, and applying this voltage to physically adjacent circuitry, referred to as "guard electrodes" 518. The bootstrap loop 508 includes a JFET-input unity gain buffer 520 (shared with the transimpedance feedback loop 506), a (band pass) phase shift network 522, a bootstrap amplifier 524, a high frequency decoupling network 528, and the L-C pair 402. The high frequency decoupling network 528 decouples the bootstrap circuit 508 from the main feedback loop 506 at frequencies near the unity gain point of the latter. The bootstrap loop 508 is configured so that the overall phase shift of the circuit 508 (i.e., with the main loop 506 open) at the carrier frequency is set to zero and the overall gain is unity. This is facilitated by the phase shift network 522, which is tuned for a particular front-end module 304 to the appropriate modulation frequency for the corresponding receive module, as dictated by the transmit frequency of the corresponding optical signal. Thus the phase shift network 522 prevents degradation of the stability margin of the transimpedance feedback loop 506 that would otherwise occur due to the addition of excessive negative conductance at its input.

The capacitance compensated by the bootstrap loop 508 includes the intrinsic photodiode capacitance 530, the capacitance 532 between the sensitive node 512 and ground in the photodiode cable, the sum total stray capacitance 534 of the PCB between the sensitive node 512 and ground, the sum total stray capacitance 535 of the PCB between the sensitive node 512 and the bootstrap signal, and the capacitance 536 between the range switch node and the supply rail of the range switch which is driven (in the AC sense) from the guard node 518. The sum total of these capacitances is resonated with an inductor 538 to reduce the amount of additional noise coupled into the front-end 304 from the bootstrap amplifier 524 itself. However, the presence of the resonant circuit 402 including inductor 538 complicates the stability requirements of the front-end 304, so that an incorrect adjustment of the varactor capacitance 540 or the varactor capacitance 504 in either direction can degrade the stability margin to the point of oscillation. Consequently, range changing and varactor tuning is performed under control of the microprocessor 222, as described below, to prevent the occurrence of such instability-in practice. Litz wire can be used in the inductors 538 and 502 to reduce the resistivity of the inductor windings and reduce the intrinsic Johnson noise associated with such resistance.

Starting from the most sensitive range and progressing to less sensitive ranges, an increasing amount of capacitance is guarded by the bootstrap system due to an increasing number of switches 510 (including additional switches not shown, as described above) being in contact with the sensitive node 512. Eventually, the capacitance to be guarded becomes so large that an additional inductor-varactor pair (not shown) is added in parallel with the second resonant network 402 to enable a resonance to be achieved at the carrier frequency. However, further addition of inductance is unnecessary when operating in the least sensitive ranges, since the overall impedance of this L-C system has minimal effect on the closed loop performance and the stability of the front-end 304, which under these conditions is dominated by the low impedance of the feedback resistor 516. A resonance at the carrier frequency is no longer sought, as any mistuning will neither affect the stability nor the open/closed loop performance.

The bootstrap loop 508 can be effectively disabled by grounding those nodes 518 that serve as guard electrodes. This allows the capacitances and inductances which are otherwise guarded by the bootstrap system to be effectively placed in parallel with the photodiode bias or first L-C network 404. In this mode, they contribute directly to the noise-gain and open-loop gain of the transimpedance feedback loop 506. Consequently, the front-end module 304 becomes more subject to any thermal and mechanical sensitivities of the normally guarded components, in particular the photodiode 302 and its cable. In addition, the open-loop gain is reduced, since the resonant impedance of the composite L-C network thus formed is much smaller than that of the L-C network 404 associated with the photodiode bias. As described above, this can greatly reduce the closed loop fractional bandwidth on the more sensitive ranges.

The ability to switch the bootstrap on and off has a more fundamental purpose in the front-end module 304 than that described above. Before use, each front-end module 304 is calibrated to determine the voltages that are applied to the varactors 540, 504 in order to achieve resonance of the L-C networks 402, 404. This adjustment is performed by measurement of the loop gain of the transimpedance feedback loop 506. This is performed under microprocessor 222 control with the aid of the DSP 216. A test tone with a frequency appropriate to the corresponding front-end channel is injected into the signal amplifier 514, and each varactor 540, 504 is adjusted to maximise the gain around the loop 506. The same DSP 216 software used in normal operation is used to measure and interpret the circuit response.

Figure 6:
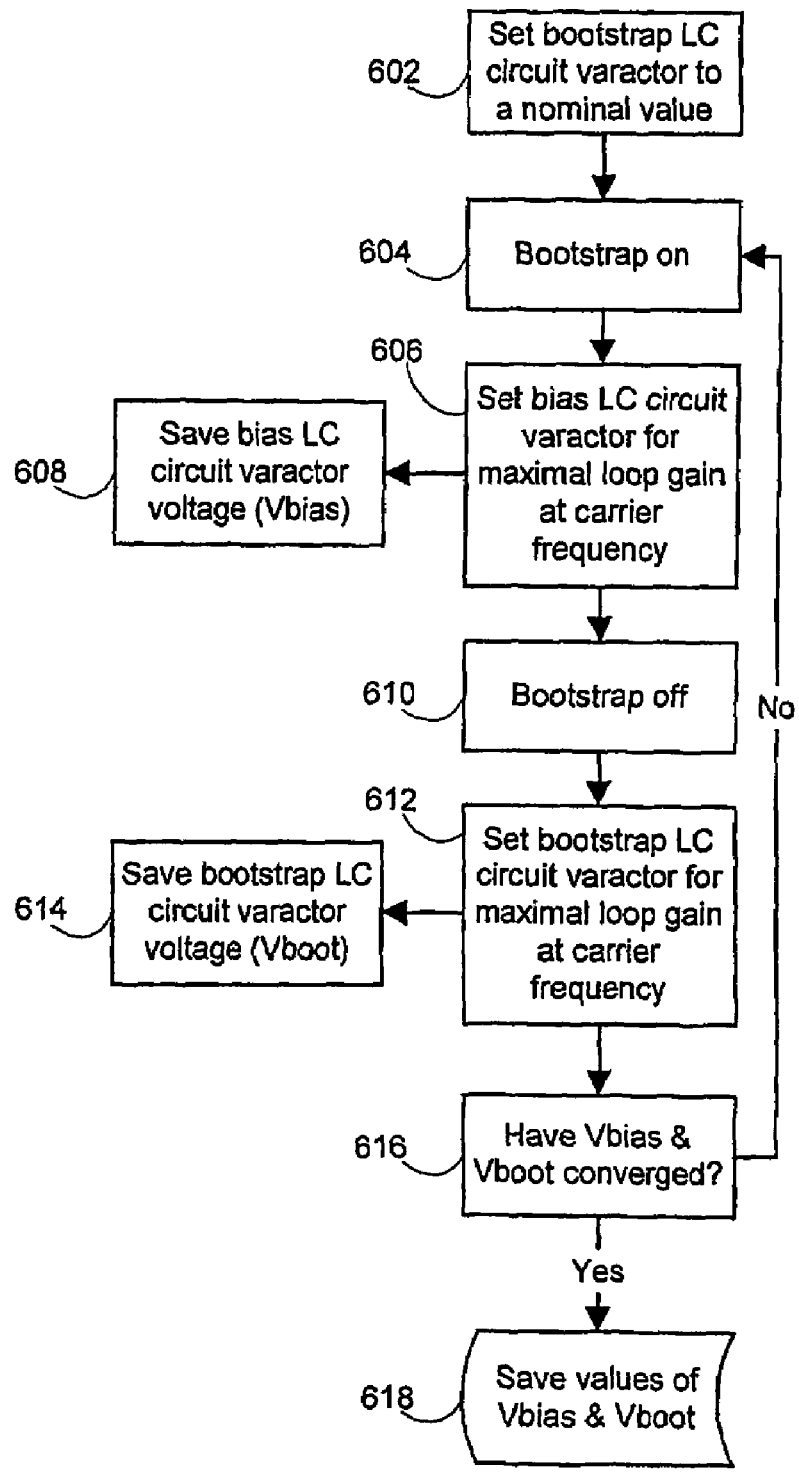
FIG. 6 is a flow diagram of a tuning process of the receiver.

As shown in FIG. 6, the process for tuning the varactors 540, 504 includes the following steps:

(i) at step 602, the bootstrap varactor 540 is set to a nominal value;

(ii) at step 604, the bootstrap loop 508 is enabled;

(iii) at step 606, the bias varactor 504 is set for maximal loop gain at the carrier frequency; at step 608, the varactor bias voltage is saved as Vbias;

(iv) at step 610, the bootstrap loop 508 is disalbed;

(v) at step 612, the bootstrap varactor 540 is set for maximal loop gain at the modulation frequency; at step 614, the varactor bias voltage is saved as Vboot;

(vi) if, at step 616, the varactor bias voltages Vbias and Vboot have not converged, then the process loops back to step 604 (ii); otherwise, the varactor bias and boot voltages are saved as Vbias and Vboot, respectively, at step 618.

This process is executed for both front-ends 304 for all but the least sensitive ranges. Each front-end 304 includes a detector (a comparator-based upper and lower bound detector with latch, not shown) which warns the DSP 216, and ultimately the microprocessor 222, if its signal amplifier 514 has been saturated by a spurious signal, with a consequent loss of the wanted signal which may still be present. Such an occurrence would adversely affect the normal process for determining when a range change is necessary, which is performed by the DSP 216. To avoid this phenomenon, if a front-end module 304 saturates, the module 304 is then set to a less sensitive range by reducing the resistance in the feedback loop 506 of the transimpedance amplifier stage using range switches 510 and reducing the gain of the signal amplifier 514.

The output of the front-end module 304 appears at the terminal 542, and is sent to a second amplification stage referred to as a post amplifier 306. A low pass filter 308 filters the output of the post amplifier 306 before it is sampled by the ADC 310 at a sampling rate of 500 kHz. This reduces aliasing of signal and noise at frequencies exceeding half the sampling rate into the frequency band of 0–250 kHz in the digital domain. The filter 308 is an active filter comprising a four stage op-amp with a low frequency, high-pass filter to remove 1/f noise originating in the front end 304. The filter 308 has sufficient gain to ensure that the noise referred from the front end 304 and present at the input of the ADC 310 overwhelms the noise contributed by the quantisation process and other non-linearities of the ADC 310. The switch-mode power supplies in the receiver unit 104 are synchronised to one half of the ADC sampling frequency to ensure that power supply noise picked up by the front-end modules 304 is aliased to DC or 250 kHz by the sampling process. Both of these frequency components are numerically eliminated by the mathematical methods employed by the DSP 216. Additionally, the front-end circuitry is entirely surrounded by a shield to minimise pick up of 250 kHz signals and harmonics, together with wide-band noise caused by switching jitter in the switch-mode power supply. The inductors in the power supplies are also shielded with shorting straps to reduce their electromagnetic field emissions.

The digitised signals from both receive modules 212, 214 are fed to a single DSP 216. The DSP 216 performs digital quadrature demodulation to down-convert these signals using local oscillator signals generated within the DSP 216. The demodulated I and Q outputs for each channel are low-pass filtered in the DSP 216 by a finite-impulse-response low-pass filter with a linear-phase response. The filter output is sub-sampled using a decimation factor of 16, giving a filtered sample rate of 31.25 kHz, or a temporal resolution of 32 microseconds. This temporal resolution is sufficient to yield sub-1% accuracy on traffic speed measurements, which is futher improved using numerical interpolation. Separate down conversion is performed for signals corresponding to the direct beam and the cross beam for each receive module 212, 214, because the modulation frequency of the cross beam for a given receive module corresponds to the modulation frequency of the direct beam for the other receive module. However, only the I outputs are provided for the cross beam signals.

The filtered-and-sub-sampled Q outputs for each channel drive a phase-frequency locked loop which performs fine adjustments to the local oscillators in the receiver 104 which are to be locked to the transmitter modulation frequencies.

This phase-frequency locking process is not significantly disturbed by the momentary beam breaks caused by traffic. When lock is achieved (for each channel), the filtered-and-subsampled I signals provide a measure of the making-and-breaking of the corresponding optical beam by traffic. Consequently, traffic speed can be calculated from the time difference between respective make or break features of the two I signals corresponding to the two direct IR beams 106, 108.

One of the transmit modules 208, 210 in the transmitter 102 is also used to convey system information from the transmitter 102 to the receiver 104. This information is conveyed by quadrature modulating the carrier with a data stream consisting of a rapidly alternating, equal positive and negative quadrature component. The alternation rate of this quadrature component data is sufficiently high that its presence does not disturb the QAM locking process described above because its average value is zero on the time scales over which the phase-frequency locked loop operates. The DSP 216 decodes this data by implementing a software UART process attached to the filtered-and-subsampled Q output of the appropriate channel.

The transmitter's microprocessor 202 is also responsible for improving the power efficiency of the two transmit modules 208, 210 by reducing the voltage supplied to the transmitter LED drive circuits. Such efficiency improvements are made possible by the use of switch-mode power supply techniques. Both microprocessors 202, 222 of the monitoring system are held in standby mode to save power and are only switched to full power and full-speed operation in response to beam make-break events identified by the DSP 216 and certain system events, including low battery warnings and external communications. IrDA and RS232 ports on the transmitter 102 are controlled by the microprocessor 202, permitting communication with an operator and/or external equipment. The SBC 218 executes a Linux™ operating system. IrDA and RS232 ports on the receiver 104 are controlled by the SBC 218, permitting communication with an operator and/or external equipment. A fiber-optic interface can be used to provide a permanent connection to the receiver 104 of the monitoring system. These communication channels can be used to collect logged internal system data and/or logged traffic data. The SBC 218 also controls operation of a GSM or GPRS wireless transceiver in the communications module 226, permitting communication via a wireless cell-phone system to remote operators and/or equipment. This can be used for remotely controlling and upgrading the monitoring system, for transferring vehicle statistics, and for transferring real-time vehicle information by SMS or pager text for enforcement purposes.

The SBC 218 also controls operation of a GPS module of the communications module 226, permitting remote operators to locate the monitoring system. Web server software on the SBC 218 permits communication with any computing device with web browser software, either remote or local, to collect information logged by the receiver 104. The receiver 104 includes up to 32 MB of data logging memory associated with the microprocessor 222, and a PC Card interface allows up to 1024 MB of removable memory.

The monitoring system can be powered by C-cells, an external rechargeable battery pack, and/or a solar panel.

Many modifications will be apparent to those skilled in the art without departing from the scope of the present invention as herein described with reference to the accompanying drawings.

The invention claimed is:

1. A process for monitoring at least one moving object, including the steps of:
   generating first and second optical signals at respective first and second locations mutually spaced along a moving direction of said object, said optical signals being modulated at respective modulation frequencies;
   transmitting said optical signals across a path of said moving object;
   detecting, at one or more detecting locations, at least one of making and breaking of each of said first and second optical signals due to movement of said object by monitoring substantially at one or more of said modulation frequencies to determine at least one of blocking and unblocking of paths between each detecting location and said first location and between each detecting location and said second location, wherein two of the detected signals correspond to respective receiving directions for a diverging signal transmitted from one of said first and second locations; and
   determining at least one parameter of said object on the basis of said detecting.

2. A process as claimed in claim 1, wherein including detecting changes in a modulation spectrum of each received signal due to movement of said object.

3. A process as claimed in claim 1, including determining a position of said object in a direction substantially transverse to said moving direction on the basis of at least one of said blocking and said unblocking of said paths.

4. A process as claimed in claim 1, including associating a time value with at least one make or break event for each of the detected signals due to the passage of said object between a transmitter and a receiver of each of said detected signals, at least one of the detected signals being substantially inclined with respect to another of the detected signals, and determining the position of said object in a direction substantially transverse to said moving direction by comparing said time values.

5. A process as claimed in claim 1, including associating respective time values with four make or break events for respective detected signals comprising first and second substantially parallel signals substantially transverse to said moving direction and transmitted from respective first and second transmitters mutually spaced in said moving direction and received at respective first and second receivers, and third and fourth signals respectively transmitted from said first transmitter and received at said second receiver, and transmitted from said second transmitter and received at said first receiver.

6. A process as claimed in claim 1, including receiving said optical signals, converting said optical signals to respective electrical signals, digitizing said electrical signals, and down-converting said digitized signals to provide data representative of at least one of making and breaking of said optical signals due to said movement.

7. A process as claimed in claim 6, wherein said downconverting is digital quadrature amplitude modulation direct downconversion.

8. A process as claimed in claim 1, wherein said at least one parameter includes the passage of said object.

9. A process as claimed in claim 1, wherein said at least one parameter includes a moving direction of said object.

10. A process as claimed in claim 1, wherein said at least one parameter includes a speed or velocity of said object.

11. A process as claimed in claim 1, wherein said at least one parameter includes a dimension of said object.

12. A process as claimed in claim 11, wherein said dimension is used to classify said object.

13. A process as claimed in claim 1, wherein said at least one parameter includes a classification of said object.

14. A process as claimed in claim 13, wherein said object includes a vehicle, and said classification is into one of a number of vehicle types.

15. A monitoring system having components for executing the steps of claim 1.

16. A computer readable storage medium, having stored thereon program code for executing the steps of claim 1.

17. A system for monitoring at least one moving object, the system including transmitters for transmitting optical signals modulated at respective different modulation frequencies, receivers for receiving said optical signals, each of said receivers being adapted to detect one or more of the received optical signals on the basis of said modulation frequencies, and means for detecting at least one of making and breaking of the one or more detected signals due to movement of said object to determine at least one parameter of said object, and means for detecting changes in a modulation spectrum of each detected signal due to said movements, wherein each of said receivers includes a sensor, an input circuit for converting one or more received optical signals to an electrical signal, and an analog-to-digital (ADC) converter for digitizing said electrical signal, and the system includes a digital signal processor (DSP) for demodulating the digitized signal from each of said receivers to provide output data representative of said at least one of making and breaking of the one or more detected optical signals, said output data including at least one of I and Q modulation data, the system including means to lock respective frequencies of one or more oscillators to said modulation frequencies on the basis of said modulation data.

18. A system as claimed in claim 17, wherein said at least one parameter includes the passage of said object.

19. A system as claimed in claim 17, wherein said at least one parameter includes a moving direction of said object.

20. A system as claimed in claim 17, wherein said at least one parameter includes a speed or velocity of said object.

21. A system as claimed in claim 17, wherein said at least one parameter includes a dimension of said object.

22. A system as claimed in claim 21, wherein said dimension is used to classify said object.

23. A system as claimed in claim 17, wherein said at least one parameter includes a classification of said object.

24. A system as claimed in claim 23, wherein said object includes a vehicle, and said classification is into one of a number of vehicle types.

25. A system for monitoring at least one moving object, the system including transmitters for transmitting optical signals modulated at respective different modulation frequencies, receivers for receiving said optical signals, each of said receivers being adapted to detect one or more of the received optical signals on the basis of said modulation frequencies, and means for detecting at least one of making and breaking of the one or more detected signals due to movement of said object to determine at least one parameter of said object, and means for detecting changes in a modulation spectrum of each detected signal due to said movement, wherein each of said receivers includes a sensor, an input circuit for converting one or more received optical signals to an electrical signal, and an analog-to-digital (ADC) converter for digitizing said electrical signal, and the system includes a digital signal processor (DSP) for demodulating the digitized signal from each of said receivers to provide output data representative of said at least one of making and breaking of the one or more detected optical signals, wherein each input circuit includes at least one variable resonant circuit, and circuitry for matching the resonant frequency of said resonant circuit to a selected modulation frequency to minimize referred input noise, maximize overall gain, and minimize input impedance at the selected modulation frequency.

26. A system as claimed in claim 25, wherein said at least one variable resonant circuit includes a varactor and an inductor in parallel.

27. A system as claimed in claim 26, wherein one of said variable resonant circuits includes an inductor used for biasing said sensor.

28. A system as claimed in claim 26, wherein said input circuit includes an input electrode, at least one guard electrode, and a bootstrap circuit for matching the potential of said at least one guard electrode to the potential of said input electrode.

29. A system as claimed in claim 28, wherein said bootstrap circuit can be selectively disabled by grounding input to said circuit.

30. A system as claimed in claim 28, wherein said bootstrap circuit includes an amplifier and a variable resonant circuit for reducing noise coupled into said input electrode from said amplifier.

31. A system as claimed in claim 30, wherein said variable resonant circuit of said bootstrap circuit includes a varactor and an inductor in parallel.

32. A system as claimed in claim 31, wherein said bootstrap circuit has substantially unity gain and substantially zero phase shift at said modulation frequency.

33. A system as claimed in claim 31, wherein said input circuit includes a signal amplifier with variable feedback.

34. A system as claimed in claim 33, wherein said variable feedback and said at least one variable resonant circuit are varied under control of a microprocessor of the receiver to maintain stability of said input circuit.

35. A process for tuning the bias varactor of the bias circuit and the bootstrap varactor of the bootstrap circuit claimed in claim 34, including the steps of:
   (i) setting the bootstrap varactor to a nominal value;
   (ii) enabling the bootstrap circuit;
   (iii) maximising loop gain of a signal amplifier of said bootstrap circuit at said modulation frequency by tuning the bias varactor;
   (iv) disabling said bootstrap circuit;
   (v) maximising the loop gain of said signal amplifier at said modulation frequency by tuning the bootstrap varactor; and
   (vi) repeating steps (ii) to (v) until the tuning voltages applied to each varactor converge.

36. A system for monitoring at least one moving object, the system including transmitters for transmitting optical signals modulated at respective different modulation frequencies, receivers for receiving said optical signals, each of said receivers being adapted to detect one or more of the received optical signals on the basis of said modulation frequencies, and means for detecting at least one of making and breaking of the one or more detected signals due to movement of said object to determine at least one parameter of said obiect, and means for detecting changes in a modulation spectrum of each detected signal due to said movement, wherein each of said receivers includes a sensor, an input circuit for converting one or more received optical signals to an electrical signal, and an analog-to-digital (ADC) converter tbr digitizing said electrical signal, and the system includes a digital signal processor (DSP) for demodulating the digitized signal from each of said receivers to provide output data representative of said at least one of making and breaking of the one or more detected optical signals, the system including at least one switch-mode power supply synchronised to half of the ADC sampling frequency, and wherein said DSP is configured to reduce digital signal artifacts from said power supply.

* * * * *